(12) United States Patent
Meng et al.

(10) Patent No.: US 12,462,610 B2
(45) Date of Patent: Nov. 4, 2025

(54) VIDEO UNDERSTANDING NEURAL NETWORK SYSTEMS AND METHODS USING THE SAME

(71) Applicant: GUANGDONG OPPO MOBILE TELECOMMUNICATIONS CORP., LTD., Guangdong (CN)

(72) Inventors: Zibo Meng, Palo Alto, CA (US); Ming Chen, Palo Alto, CA (US); Chiuman Ho, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 1010 days.

(21) Appl. No.: 17/538,512

(22) Filed: Nov. 30, 2021

(65) Prior Publication Data
US 2022/0157059 A1    May 19, 2022

Related U.S. Application Data

(63) Continuation of application No. PCT/CN2019/122358, filed on Dec. 2, 2019.
(Continued)

(51) Int. Cl.
*G06V 40/20* (2022.01)
*G06N 3/045* (2023.01)
(Continued)

(52) U.S. Cl.
CPC .......... *G06V 40/23* (2022.01); *G06T 3/4046* (2013.01); *G06V 10/454* (2022.01);
(Continued)

(58) Field of Classification Search
CPC .. G06V 40/23; G06V 10/454; G06V 10/7715; G06V 10/82; G06V 20/41;
(Continued)

(56) References Cited

U.S. PATENT DOCUMENTS

| 2015/0242746 A1* | 8/2015 | Rao ........................ G06N 3/088 |
|---|---|---|
|  |  | 706/16 |
| 2016/0259994 A1 | 9/2016 | Ravindran et al. |

(Continued)

FOREIGN PATENT DOCUMENTS

| CN | 106778867 | 5/2017 |
|---|---|---|
| CN | 108021933 | 5/2018 |

(Continued)

OTHER PUBLICATIONS

Karpathy et al., NPL ("Large-scale Video Classification with Convolutional Neural Networks" Published 2014 (Total 8 pages), (Year: 2014).*

(Continued)

*Primary Examiner* — Quoc A Tran
(74) *Attorney, Agent, or Firm* — Hodgson Russ LLP

(57) ABSTRACT

The present disclosure relates to a Temporal Information Aggregation (TIA) neural network block to extract underlying multiscale temporal information. By applying TIA, information in different temporal scales may be effectively extracted. The TIA block may be implemented as a block and thus may be inserted into any architectures. The extracted multi-scale temporal information contributes to the final output as a residual.

20 Claims, 8 Drawing Sheets

Related U.S. Application Data

(60) Provisional application No. 62/855,489, filed on May 31, 2019.

(51) Int. Cl.
*G06N 3/048* (2023.01)
*G06T 3/4046* (2024.01)
*G06V 10/44* (2022.01)
*G06V 10/77* (2022.01)
*G06V 10/82* (2022.01)
*G06V 20/40* (2022.01)

(52) U.S. Cl.
CPC .......... *G06V 10/7715* (2022.01); *G06V 10/82* (2022.01); *G06V 20/41* (2022.01); *G06V 20/46* (2022.01); *G06N 3/045* (2023.01); *G06N 3/048* (2023.01)

(58) Field of Classification Search
CPC ...... G06V 20/46; G06T 3/4046; G06N 3/045; G06N 3/048
See application file for complete search history.

(56) References Cited

U.S. PATENT DOCUMENTS

| | | | |
|---|---|---|---|
| 2018/0253636 | A1 | 9/2018 | Lee et al. |
| 2020/0058126 | A1* | 2/2020 | Wang .................... G06N 3/045 |

FOREIGN PATENT DOCUMENTS

| | | |
|---|---|---|
| CN | 109002885 | 12/2018 |
| CN | 109253708 | 1/2019 |
| CN | 109726739 | 5/2019 |
| JP | 2018170003 | 11/2018 |
| WO | 2016197046 | 12/2016 |

OTHER PUBLICATIONS

Wu et al., NPL ("Evaluating Two-Stream CNN for Video Classification" Published 2015 (pp. 435-442) (Year: 2015).*
Guo et al., "Exploiting long-term temporal dynamics for video captioning," arXiv:2202.10828v1, Feb. 22, 2022.
Wu et al., "Action Recognition and Localization with Instance FCNN," Proceedings of the 2018 IEEE International Conference on Real-time Computing and Robotics, Aug. 2018.
CNIPA, First Office Action for CN Application No. 201980096734. 5, Jul. 26, 2024.
WIPO, International Search Report and Written Opinion for PCT/CN2019/122358, Mar. 4, 2020.
EPO, Extended European Search Report for EP Application No. 19930523.6, Jun. 24, 2022.
Guo, "Exploiting long-term temporal dynamics for video captioning," World Wide Web, 2019, vol. 22.
Wu et al., "Action Recognition and Localization with Instance FCNN," Proceedings of the 2018 IEEE International Conference on Real-time Computing and Robotics, 2018.
Courtney et al., "Learning From Videos With Deep Convolutional LSTM Networks," arxiv:1904.04817v1, 2019.
Ma et al., "TS-LSTM and Temporal-Inception: Exploiting Spatiotemporal Dynamics for Activity Recognition," Signal Processing: Image Communication, 2018.

* cited by examiner ically processing the second feature map; and generating, by the target neural network block, a third feature map by combining the temporal feature map with the second feature map.

VIDEO UNDERSTANDING NEURAL NETWORK SYSTEMS AND METHODS USING THE SAME

CROSS REFERENCE

The present application is a continuation of International Patent Application No. PCT/CN2019/122358, filed on Dec. 2, 2019, which claims priority to U.S. Provisional Patent Application No. 62/855,489, filed on May 31, 2019, the entire disclosures of which are incorporated herein by reference.

TECHNICAL FIELD

The present disclosure generally relates to neural network systems and methods. Specifically, the present disclosure relates to video understanding neural network systems and methods using the same.

BACKGROUND

Video is an indispensable part of today's big data. Motivated by the advances in deep learning in image and speech, using deep learning techniques to understand video contents has become one of the hottest topics. Compared to stationary images, extra multi-scale temporal patterns are hidden in video data. Video understanding, such as video classification or other types of machine learning method using artificial intelligence, targets at extracting robust video feature representations and effectively exploiting multi-scale spatiotemporal clues in video to automatically categorize video clips based on their semantic contents like human action or complex events.

Extensive work has been developed for this task. However, current work is generally subject to expensive computational cost or memory overheads. For example, two-stream CNN is computational expensive and fails to take the order of frame into account and cannot analyze the temporal dynamics in the videos; non-local Neural Network is characterized by large memory overheads in matrix multiplication; and Slow-Fast Network is computational expensive.

Therefore, it is necessary to find an efficient, light-weight but generic component for capturing time-dependencies within deep neural networks.

SUMMARY OF THE DISCLOSURE

An aspect of the present disclosure relates to a neural network system (e.g., 2D, 3D neural network system or a neural network system of other dimensions) implemented by one or more electronic devices. The neural network includes: a baseline neural network for processing a plurality of images constructed in a time sequence, the baseline neural network including: a first baseline block configured to convert a first feature map associated with the plurality of images to a second feature map by processing at least one spatial feature in the first feature map; and a target neural network block adjacent to the first baseline block, the target neural network block configured to: convert the second feature map to a temporal feature map by temporally processing the second feature map; and generate a third feature map by combining the temporal feature map with the second feature map.

According to an aspect of the present disclosure, a method for analyzing a plurality of images constructed in a time sequence (e.g., a video clip) using at least one neural network is developed. The method includes: converting, by a first block of a baseline neural network, first feature map associated with the plurality of images to the second feature map by processing at least one spatial feature in the first feature map; and converting, by a target neural network block, the second feature map to a temporal feature map by temporally processing the second feature map; and generating, by the target neural network block, a third feature map by combining the temporal feature map with the second feature map.

According to another aspect of the present disclosure, a non-transitory storage medium may include a set of instructions for a neural network (e.g., 2D, 3D neural network system or a neural network system of other dimensions) and operating instructions to operate the neural network. When executing the set of instructions, processors of an electronic device may perform the following actions: converting, by a first block of a baseline neural network, first feature map associated with the plurality of images to second feature map by processing at least one spatial feature in the first feature map; and converting, by a target neural network block, the second feature map to a temporal feature map by temporally processing the second feature map; and generating, by the target neural network block, a third feature map by combining the temporal feature map with the second feature map.

BRIEF DESCRIPTION OF THE DRAWINGS

The present disclosure is further described in terms of exemplary embodiments. The foregoing and other aspects of embodiments of present disclosure are made more evident in the following detail description, when read in conjunction with the attached drawing figures.

DETAILED DESCRIPTION

Figure 1:
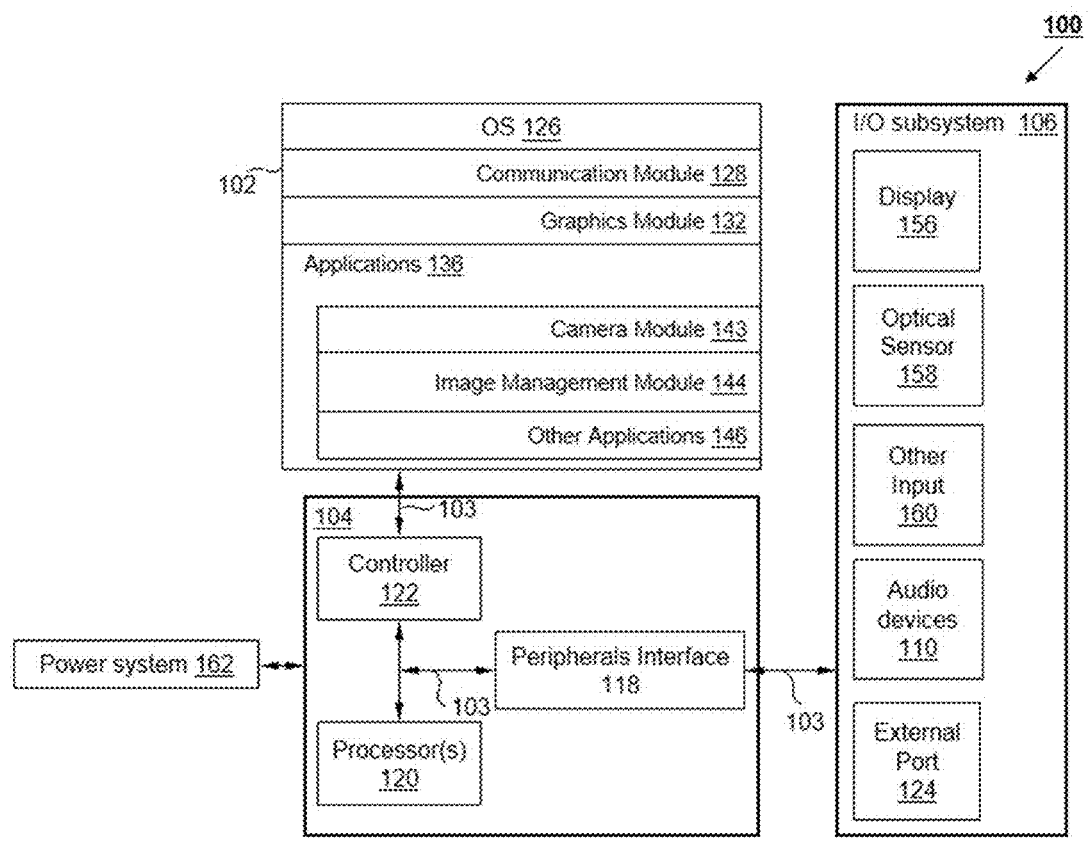
FIG. 1 is a block diagram illustrating an electronic device to operate the neural network systems and video classification methods introduced in the present disclosure in accordance with some embodiments.

An aspect of the present disclosure relates to a Temporal Information Aggregation (TIA) module or block. By continuously temporally pooling a feature map with various pooling windows, TIA block may effectively extract underlying multiscale temporal information from the feature map. The extracted multi-scale temporal information may then contribute to the final output of a neural network or part of the neural network as a residual. The TIA module/block may be inserted into any neural network architectures (such as a ResNet-50 network) for various computer vision tasks, such as video search, moment search, and captioning, etc. Depending on the temporal scale that is in need to understand a video clip, the pooling windows may be the same or different from a corresponding temporal scale of the kernel of a convolutional layer in the baseline neural network, so that the temporal information extracted by the TIA is of a different scale from that of the baseline neural network.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

It will also be understood that, although the terms first, second, etc. may be used herein to describe various elements, these elements should not be limited by these terms. These terms are only used to distinguish one element from another. For example, a first contact could be termed as a second contact, and, similarly, a second contact could be termed as a first contact, without departing from the scope of the present invention. The first contact and the second contact are both contacts, but they are not the same contact.

The terminology used herein is for the purpose of describing the particular example embodiments only and is not intended to be limiting. As used herein, the singular forms "a," "an," and "the" may be intended to include the plural forms as well, unless the context clearly indicates otherwise. It will be further understood that the terms "comprises," "comprising," "may include," and/or "including" when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, programs, instructions, and data are stored in predetermined data structures. For example, a data structure may include a first portion, a second portion, and a third portion of bytes. The second portion may include contents of that the data are about. For example, for an image stored in a storage medium, the content data thereof may be the substance content of the image. For an instruction, the contents may be substance contents of the command corresponding to the instruction. The third portion of the data may be a pointer end, the pointer head may point to the first portion of next data bytes. The first portion of the data may be a pointer head, wherein the pointer end may be connected to the third data portion of another data bytes.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate the operations that the systems implement according to some embodiments in the present disclosure. It is to be expressly understood that the operations of the flowchart may or may not be implemented in order. Conversely, the operations may be implemented in inverted order, or simultaneously. Moreover, one or more other operations may be added to the flowcharts. One or more operations may be removed from the flowcharts.

Moreover, while the system and method in the present disclosure are described primarily in regard to electronic devices such as computers, work stations, and servers, it should also be understood that this is only an example implementation of the systems and methods introduced in the present disclosure. One of ordinary skills in the art would understand at the time of filing of this application that the systems and methods in the present disclosure may also be implemented in other electronic devices, such as smartphones, tablet computer, laptop computers, desktop computers, smart cameras, or other electronic devices that has video/image sequences processing capabilities.

FIG. 1 is a block diagram illustrating an electronic device to operate the neural network systems and video classification methods introduced in the present disclosure in accordance with some embodiments. For example, the electronic device 100 may be one or more computers, work stations, servers, smartphones, other mobile devices, or other electronic devices.

The portable device 100 may include processor(s) 120 (e.g., CPU and/or GPU and/or DSP), memory controller 122, memory 102, peripherals interface 118, power system 162, and I/O subsystem 106 connected to the peripherals interface 118. In some embodiments, peripherals interface 118, CPU(s) 120, and memory controller 122 may be implemented on a single chip, such as chip 104. In some other embodiments, they may be implemented on separate chips.

Power system 162 may provide power to the various components (e.g., CPU(s) 120, memory controller 122, memory 102, peripherals interface 118, power system 162, and a number of I/O subsystems 106 connected to the peripherals interface 118) in the device 100. Power system 162 may include a power management system, one or more power sources (e.g., battery, alternating current (AC)), a recharging system, a power failure detection circuit, a power converter or inverter, a power status indicator (e.g., a lightemitting diode (LED)) and any other components associated with the generation, management and distribution of power in portable devices.

I/O subsystem 106 may include external port 124, audio devices 110, external port 124, display 156, and optical sensor 158. Peripheral interface 118 may receive/send electrical signals from/to their corresponding devices in the I/O subsystem 106.

Audio devices 110, such as speaker and/or microphone may provide an audio interface between a user and device 100.

Display 156 may provide an input/output interface to a user. In some embodiments, display 156 may be a screen or touch-sensitive screen of the device 100. Peripheral interface 118 may receive and/or send electrical signals from/to touch-sensitive display system 112. Touch-sensitive display system 112 may display visual output (e.g., image or video stream) to the user and/or receive instructions from the user.

Optical sensor(s) 158 may be one or more built-in cameras, which include one or more lenses and charge-coupled device (CCD) or complementary metal-oxide semiconductor (CMOS) phototransistors. Optical sensor(s) 158 may receive light from the environment, projected through one or more lens, and converts the light to data representing an image. In conjunction with imaging module 143 (also called a camera module), optical sensor(s) 158 may capture still images and/or video stream.

The image or video stream may also be inputted to peripheral interface 118 through other input devices 160, such as an internal and/or external memory storing such image and video.

Memory 102 may include a mass storage, a removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random-access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, memory 102 may store one or more software components to perform exemplary methods described in the present disclosure. For example, memory 102 may store a program for the processor to process images data stored in memory 102 or received by processor 120 from an I/O device, such as a built-in camera.

In some embodiments, the one or more software components may include operating system 126, communication module (or set of instructions) 128, graphics module (or set of instructions) 132, and applications (or sets of instructions) 136.

Operating system 126 (e.g., ANDROID, iOS, Darwin, RTXC, LINUX, UNIX, OS X, WINDOWS, or an embedded operating system such as VxWorks) may include various software components and/or drivers for controlling and managing general system tasks (e.g., memory management, storage device control, power management, etc.) and facilitates communication between various hardware and software components.

Communication module 128 may facilitate communication with other devices over one or more external ports 124 and also may include various software components for handling data received external port 124. External port 124 (e.g., Universal Serial Bus (USB), FIREWIRE, etc.) may be adapted for coupling directly to other devices or indirectly over a network (e.g., the Internet, wireless LAN, etc.). In some embodiments, the external port may be a multi-pin (e.g., 30-pin) connector.

Graphics module 132 may include various known software components for rendering and displaying graphics on display 156, including components for changing the visual impact (e.g., brightness, transparency, saturation, contrast or other visual property) of graphics that are displayed. As used herein, the term "graphics" may include any object that can be displayed to a user, including without limitation text, web pages, icons (such as user-interface objects including soft keys), digital images, videos, animations and the like.

In some embodiments, graphics module 132 may store data representing graphics to be used. Each graphic is, optionally, assigned a corresponding code. Graphics module 132 may receive the data from applications or optical sensor 158, etc.

Applications 136 may include the following modules (or sets of instructions), or a subset or superset thereof: camera module 143 for still and/or video images, image management module 144, as well as other applications 146. Examples of other applications 146 stored in memory 102 may include neural network applications such as 3-D ResNet-50 networks or any modifications based thereon.

In conjunction with display 156, optical sensor(s) 158, optical sensor 158, graphics module 132, and image management module 144, camera module 143 may include executable instructions to capture still images or video (including a video stream) from the optical sensor(s) 158 (e.g., cameras) and store them into memory 102, modify characteristics of a still image or video, and/or delete a still image or video from memory 102.

In conjunction with display controller 156, graphics module 132, and camera module 143, image management module 144 may include executable instructions to arrange, modify (e.g., edit), or otherwise manipulate, label, delete, present (e.g., in a digital slide show or album), and store still and/or video images.

Each of the above identified modules and applications may correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-constructed in various embodiments. In some embodiments, memory 102 may store a subset of the modules and data structures identified above. Furthermore, memory 102 optionally stores additional modules and data structures not described above.

Further, the above-mentioned components of device 100 may communicate over one or more communication buses or signal lines 103.

It should be appreciated that device 100 is only one example of an electronic device, and that device 100 may have more or fewer components than shown, may combine two or more components, or optionally has a different configuration or arrangement of the components. The various components shown in FIG. 1 are implemented in hardware, software, firmware, or a combination thereof, including one or more signal processing and/or application specific integrated circuits.

Figure 2:
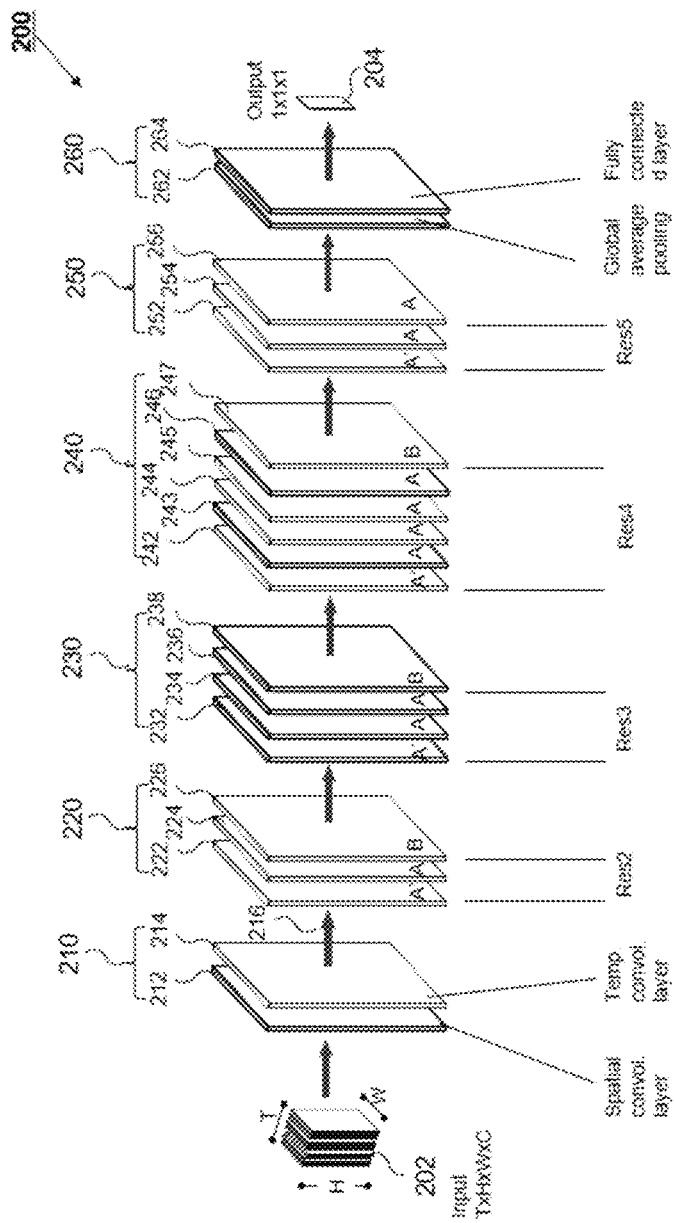
FIG. 2 illustrates a structure of a baseline neural network for classifying and analyzing video clips in accordance with some embodiments.

An aspect of the present disclosure is the temporal information aggregation (TIA) module/block that may be easily inserted into a neural network, called the baseline neural network, which is suitable for understanding the contents of and classifying video clips and/or sound tracks. FIG. 2 illustrates a structure of the baseline neural network 200 for classifying video clips in accordance with some embodiments. The neural network 200 may be implemented in the electronic device 100 as sets of instructions and/or programs. Accordingly, to classify a video clip or a sound track, the chip 104 and/or the processor(s) 120 of device 100 may communicate with the memory 102 and execute the sets of instructions of the neural network 200 to load and activate the neural network 200. The neural network 200 may then perform the actions and/or methods disclosed in the present application.

Further, for illustration purpose only, the following description uses a 3-D ResNet-50 deep learning neural network as an example of neural network 200 to classify video clips. However, it should be understood by one of ordinary skill in the art that other types of 2-D or 3-D neural networks may also be used for video content understanding (e.g. video classification). Further, in addition to video content understanding, in scenarios of audio signal understanding (e.g., audio classification), the TIA module/block may also be inserted in neural networks suitable for audio content understanding. Any suitable type of 2-D or 3-D neural network suitable for sound track content learning and/or classification, such as 2-D ResNet-50, can be used in the present disclosure.

The baseline network 200 may include a plurality of stages sequentially connected to one another in series. Each stage may include a plurality of blocks. The baseline network 200 may repeatedly employ/adopt three (3) baseline neural network block structures: structure A, structure A', and structure B.

Figure 3A:
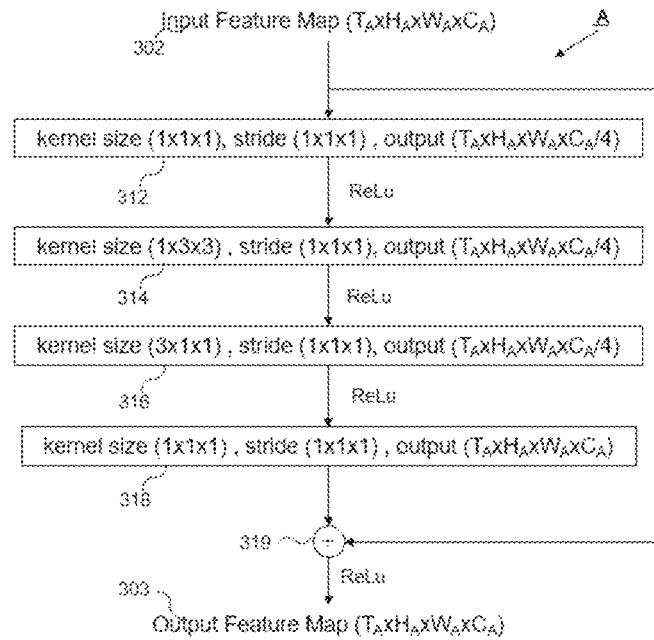
FIG. 3A is a block diagram illustrating a neural network block structure of the baseline neural network in accordance with some embodiments.

FIG. 3A is a block diagram illustration of an exemplary embodiment of the structure A in accordance with the present disclosure. The neural network block structure A may include a plurality of separable 3-D convolutional layers, i.e., the structure A may be designed/constructed to decouple convolution operations to an input at different domains in different layers. For example, for an input feature map 302 relating to the plurality of original image frames of the video clip, the feature map 302 may include information in both spatial domain and temporal domain. Accordingly, a feature map may be expressed by $T \times H \times W \times C$, where T represents the temporal axis, H and W respectively represent spatial axis, C is the number of channels of the feature map. Specifically, for structure A, the feature map 302 may be expressed as $T \times H \times W \times C = T_A \times H_A \times W_A \times C_A$, where the subscript A means structure A. The neural network block structure A in FIG. 3A may be designed to conduct spatial convolution and temporal convolution to the input feature map 302 through separate and independent convolutional layers. To this end, the neural network block structure A may include 4 convolutional layers.

The first convolutional layer 312 may be designed/constructed to change the channel number of the input feature map from $C_A$ to $C_A/4$ from the feature map 302. To this end, the first convolutional layer 312 may include a kernel size of $1 \times 1 \times 1$ and a stride of $1 \times 1 \times 1$ at the T axis, H axis, and W axis of the input feature map 302. Accordingly, the output feature of the convolutional layer 312 may be of a size of $T_A \times H_A \times W_A \times C_A/4$.

The second convolutional layer 314 may be configured to conduct and/or perform a pure spatial convolution to the output of the first convolutional layer 312 without doing anything in the temporal domain. To this end, the second convolutional layer 314 may be designed/constructed to perform convolution in the spatial domain, i.e., the kernel size may be 1 in the temporal axis (T axis) and greater than 1 in the spatial domain (H axis and W axis). In the embodiment shown in FIG. 3A, the kernel size of the second convolutional layer 314 is $1 \times 3 \times 3$. Further, the second convolutional layer 314 may be designed/constructed to keep the size of the feature map unchanged at the spatial domain. Accordingly, the second convolutional layer 314 may additionally include padding operations to the spatial domain, and the stride in the second convolutional layer 314 may be $1 \times 1 \times 1$. The second convolutional layer 314 may also be designed/constructed to keep the number of channels in the output of the first convolutional layer 312 unchanged. Accordingly, the size of the output of the second convolutional layer 314 may be $T_A \times H_A \times W_A \times C_A/4$.

The third convolutional layer 316 may be designed/constructed to conduct and/or perform a pure temporal convolution to the output of the second convolutional layer 314 without doing anything in the spatial domain. To this end, the third convolutional layer 316 may be designed/constructed to perform convolution in the temporal domain, i.e., the kernel size may be $1 \times 1$ in the spatial axis (H axis and W axis) and greater than 1 in the temporal domain (T axis). In the embodiment shown in FIG. 3A, the kernel size of the third convolutional layer 316 is $3 \times 1 \times 1$. Further, the third convolutional layer 316 may be designed/constructed to keep the size of the feature map unchanged at the temporal domain. Accordingly, the third convolutional layer 316 may additionally include padding operations to the temporal domain, and the stride in the third convolutional layer 316 may be $1 \times 1 \times 1$. The third convolutional layer 316 may also be designed/constructed to keep the number of channels in the output of the first convolutional layer 314 unchanged. Accordingly, the size of the output of the second convolutional layer 316 may be $T_A \times H_A \times W_A \times C_A/4$.

The fourth convolutional layer 318 is designed/constructed to change the channel number of the input feature map from $C_A/4$ back to $C_A$ from the output feature map from the third convolutional layer 316. To this end, the fourth convolutional layer 318 may include a kernel size of $1 \times 1 \times 1$ and a stride of $1 \times 1 \times 1$ at the T, H, W axis. Accordingly, the output feature map of the fourth convolutional layer 318 may be of a size of $T_A \times H_A \times W_A \times C_A$, same as the input feature map 302. The output feature map of the fourth convolutional layer 318 may be called a residual feature map.

After obtaining the residual feature map, the structure A may further include a summation unit 319 to conduct a summation 319 between the original input 302 and the residual feature map. The summation result may be the output feature map 303 of the structure A.

Additionally, structure A may also include a number of rectifiers in positions shown in FIG. 3A.

Figure 3B:
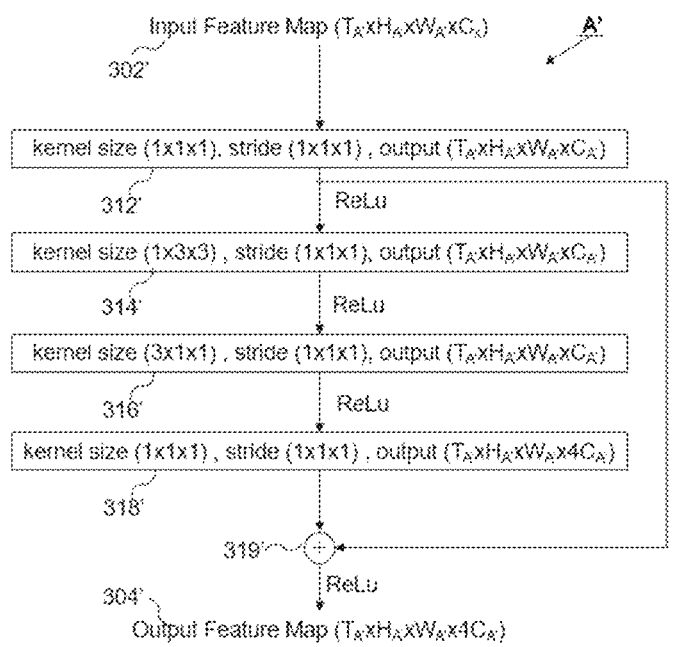
FIG. 3B is a block diagram illustrating another neural network block structure of the baseline neural network in accordance with some embodiments.

FIG. 3B is a flowchart illustration of an exemplary embodiment of the structure A' in accordance with the present disclosure. The neural network block structure A' may include a plurality of separable 3-D convolutional layers, i.e., the structure A' may be configured/designed to decouple the convolutions to an input at different domains in different layers. For example, for an input feature map 302' relating to the plurality of original image frames of the video clip, the feature map 302' may include information in both spatial domain and temporal domain. Accordingly, the feature map 302' may be expressed by T×H×W×C=TA'∴HA'∴WA'×Cx where the subscription A' means structure A', and Cx means the number of channels that the input feature map has. The neural network block structure A' in FIG. 3B may be designed/constructed to conduct spatial convolution and temporal convolution to the input feature map 302' through separate and independent convolutional layers. To this end, the neural network block structure A' may include 4 convolutional layers.

The first convolutional layer 312' may be designed/constructed to output the channel number of the input feature map from whatever the number of input channel Cx to a predetermined number CA' from the feature map 302'. To this end, the first convolutional layer 312' may include a kernel size of 1×1×1 and a stride of 1×1×1 at the T, H, W axis. Consequently, the output feature of the convolutional layer 312' may be of a size of TA'×HA'×WA'×CA'.

Parameters in the second convolutional layer 314', the third convolutional layer 316', and the fourth convolutional layer 316' of structure A', as well as the rectifier ReLu may remain the same as the corresponding layer of structure A. Further, the summation unit 319' of the structure A' may connect the residual feature map (i.e., output from the fourth convolutional layer 318') and the output feature map of the first convolutional layer 312'. Accordingly, the channel of the final output feature map 304' of structure A' may be 4 times of 4CA'. Therefore, the final output feature map 304' may be of a size of TA'×HA'×WA'×4CA'.

Figure 3C:
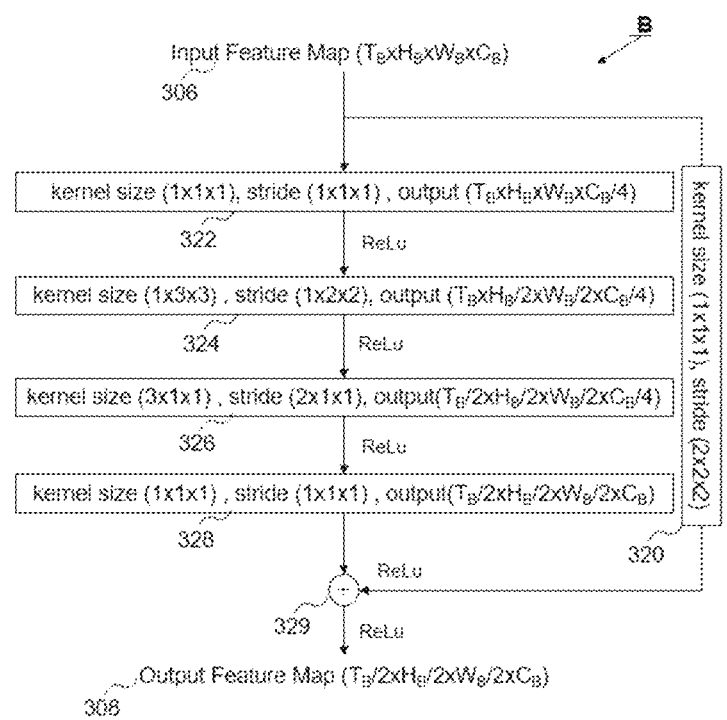
FIG. 3C is a block diagram illustrating further another neural network block structure of the baseline neural network in accordance with some embodiments.

FIG. 3C is a flowchart illustration of an exemplary embodiment of the structure B in accordance with the present disclosure. The neural network block structure B may include a plurality of separable 3-D convolutional layers, i.e., the structure B may be configured/designed to decouple the convolutions to an input at different domains in different layers. For example, for an input feature map 306 relating to the plurality of original image frames of the video clip, the feature map 306 may include information in both spatial domain and temporal domain. Accordingly, the feature map 306 may be expressed by T×H×W×C=TB×HB×WB×CB, where the subscript B means structure B. The neural network block structure B in FIG. 3C may be designed to conduct spatial convolution and temporal convolution to the input feature map 306 through separate and independent convolutional layers. The neural network block structure B may also reduce the size of the output feature map. To this end, the neural network block structure B may include 5 convolutional layers.

The first convolutional layer 322 may be designed/constructed to shrink the channel number of the input feature map from CB to CB/4 from the feature map 306. To this end, the first convolutional layer 322 may include a kernel size of 1×1×1 and a stride of 1×1×1 at the T, H, W axis. Accordingly, the output feature of the convolutional layer 322 may be of a size of TB×HB×WB×CB/4.

The second convolutional layer 314 may be configured to conduct and/or perform a pure spatial convolution to the output of the first convolutional layer 322 without doing anything in the temporal domain. To this end, the second convolutional layer 324 may be designed/constructed to perform convolution in the spatial domain, i.e., the kernel size may be 1 in the temporal axis (T axis) and greater than 1 in the spatial domain (H axis and W axis). In the embodiment shown in FIG. 3A, the kernel size of the second convolutional layer 314 is 1×3×3. Further, the second convolutional layer 314 may be designed/constructed to reduce the size of the feature map at the spatial domain. Accordingly, the stride in the second convolutional layer 324 may be 1×2×2. The second convolutional layer 314 may also be designed/constructed to keep the number of channels in the output of the first convolutional layer 322 unchanged. Accordingly, the size of the output of the second convolutional layer 314 may be TB×HB/2×WB/2×CB/4.

The third convolutional layer 326 may be designed/constructed to conduct and/or perform a pure temporal convolution to the output of the second convolutional layer 324 without doing anything in the spatial domain. To this end, the third convolutional layer 326 may be designed/constructed to perform convolution in the temporal domain, i.e., the kernel size may be 1×1 in the spatial axis (H axis and W axis) and greater than 1 in the temporal domain (T axis). In the embodiment shown in FIG. 3C, the kernel size of the third convolutional layer 326 is 3×1×1. Further, the third convolutional layer 326 may be designed/constructed to reduce the size of the feature map at the temporal domain. For example, the stride in the third convolutional layer 326 may be 2×1×1. The third convolutional layer 326 may be designed/constructed to keep the number of channels in the output of the second convolutional layer 324 unchanged. Accordingly, the size of the output of the second convolutional layer 326 may be TB/2×HB/2×WB/2×CB/4.

The fourth convolutional layer 328 may be designed/constructed to change the channel number of the input feature map from CB/4 back to CB from the output feature map from the third convolutional layer 326. To this end, the fourth convolutional layer 328 may include a kernel size of 1×1×1 and a stride of 1×1×1 at the T, H, W axis. Accordingly, the output feature of the convolutional layer 328 may be of a size of TB/2×HB/2×WB/2×CB. The output feature map of the fourth convolutional layer 328 may be called a residual feature map of structure B.

The fifth convolutional layer 320 may be designed/constructed to process the input feature map 306, making the output of the fifth convolutional layer match the size of the residual feature map, i.e., adjust the size of the input feature map to TB/2×HB/2×WB/2 without changing the channel number of the input feature map from the feature map 306. To this end, the fifth convolutional layer 320 may include a kernel size of 1×1×1 and a stride of 2×2×2 at the T, H, W axis. Accordingly, the output feature of the convolutional layer 322 may be of a size of TB/2×HB/2×WB/2×CB.

After obtaining the residual feature map, the structure B may further include a summation unit 329 to conduct a summation of the output feature map of the fifth convolutional layer 320 and the residual feature map. The summation result may be the output feature map 308 of the structure B.

Additionally, structure B may also include a number of rectifiers in positions shown in FIG. 3C.

Referring back to FIG. 2, the baseline network 200 may include a plurality of stages sequentially connected to one another in series. Each stage may include a plurality of blocks. For example, in the embodiment shown in FIG. 2, the baseline network 200 may include 6 stages, i.e., a first stage 210, a second stage 220, a third stage 230, a fourth stage 240, a fifth stage 250, and a sixth stage 260. Specifically, for a ResNet neural network, the second stage 220 (Res2), the third stage 230 (Res3), the fourth stage 240 (Res4), and the fifth stage 250 (Res5) may include a plurality of residual blocks as shown in FIG. 3A-C.

The first stage 210 may be the first neural network stage to receive an input. In the embodiment shown in FIG. 2, the first stage 210 may receive an input 202. The input 202 may be a plurality of original image frames of a video clip. The plurality of image frames may be constructed in a same order as in the video clip, i.e., the image frames are in a temporal sequence one next to another. The input may also be an output feature map of another video processing system corresponding to the plurality of original image frames. Because the input 202 is or corresponds to the plurality of original image frames of a video clip, the input 202 may be a 3-D input feature map with a size of T×H×W×C=T0×H0×W0×C0, wherein C0 is the number of channels in the input. W0 and H0 are respectively the width and height of the input 202, corresponding to the width and height of each of the image fames of the video clip. T0 is the length of the input feature data 202, corresponding to the time of the video clip. For example, if a video plays 32 frames of color image per second, each image has a resolution of 112×112 and is presented as superimposition of Red, Green, and Blue color-spaces (i.e., 3 channels), then a 1 second video clip includes a sequence of 32 image frames, and the dimension of the sequence of image frames, as the input 202 of the neural network 200, is 32×112×112×3.

The first stage 210 may take the input 202 and output the feature map 216. The first stage 210 may include several convolution layers, which respectively extract spatial features and temporal features from the input 202, as well as adjusting the channel number of the input 202 to a predetermined number. For example, the first state 210 may include a spatial convolutional layer 212 and a temporal convolutional layer 214 connected to the spatial convolutional layer 212 in series. For example, the spatial convolutional layer 212 may be a 1×7×7 layer, with a stride of 1×2×2 in the T, H, and W axis, respectively, and an output channel size of 64, i.e., the output includes 64 channels; and the temporal convolutional layer 214 may be a 3×1×1 layer, with a stride of 2×1×1 in the T, H, and W axis, respectively, and an output channel C=64.

Accordingly, the spatial convolutional layer 212 may receive the input 202 sizes T×H×W×C=32×112×112×3, and perform convolution in the spatial domain (i.e., along H axis and W axis) to the input 202. The output of the spatial convolutional layer 212 may be a T×H×W×C=32×56×56×64 feature map that includes extracted spatial features of the input 202. The output of the spatial convolutional layer 212 may then be inputted into the temporal convolutional layer 214.

The temporal convolutional layer 214 may be designed/constructed to perform convolution to the output of the convolutional layer 212 in temporal domain (i.e. along T axis). Output 216 from the temporal convolutional layer 214 may become a 16×56×56×64 feature map, including both spatial and temporal information of the input 202.

Because the convolutional layer 212 is designed to merely perform spatial convolution to a 4-D input, and the convolutional layer 214, connected to the convolutional layer 212 in series, is designed to merely perform temporal convolution to a 4-D input, the first stage 210 is a separable 3-D convolutional stage.

The feature map 216 then may sequentially pass through the second stage 220, the third stage 230, the fourth stage 240, and the fifth stage 250. Each of the second to fifth stage includes a plurality of convolutional blocks. Each of the convolutional blocks may include different structures of convolutional layers. Alternatively, structure of each of the convolutional blocks may be identical.

For example, in FIG. 2, the second stage 220 may include 3 convolutional blocks. Structures of the 3 convolutional blocks 222, 224, and 226 may be employed/adopted as [A', A, B], respectively. Specifically, the convolutional block 222 may be a structure A' convolutional block, wherein the number of channels CA'=64; the convolutional block 224 may be a structure A convolutional block; and the convolutional block 226 may be a structure B block. Accordingly, for the 32×112×112×3 original image frames, the output feature map of the second stage 220 may be 8×28×28×256.

The third stage 230 may include 4 convolutional blocks. Structures of the 4 convolutional blocks 232, 234, 236, and 238 may be employed/adopted as [A', A, A, B], respectively. specifically, the convolutional block 232 may be a structure A' convolutional block, wherein the number of channels CA'=128; the convolutional block 234 and the convolutional block 236 may respectively be a structure A convolutional block; and the convolutional block 236 may be a structure B block. Accordingly, for the 32×112×112×3 original image frames, the size of the output feature map of the third stage 230 may be 4×14×14×512.

The fourth stage 240 may include 6 convolutional blocks. Structures of the 6 convolutional blocks 242, 243, 244, 245, 246, and 247 may be employed/adopted as [A', A, A, A, A, B], respectively. Specifically, the convolutional block 242 may be a structure A' convolutional block, wherein the number of channels CA'=256; the convolutional block 243, the convolutional block 244, the convolutional block 245, and the convolutional block 246 may respectively be a structure A convolutional block; and the convolutional block 237 may be a structure B block. Accordingly, for the 32×112×112×3 original image frames, the size of the output feature map of the fourth stage 240 may be 2×7×7×1024.

The fifth stage 250 may include 3 convolutional blocks. Structures of the 3 convolutional blocks 252, 254, and 256 may be employed/adopted as [A', A, A], respectively. Specifically, the convolutional block 252 may be a structure A' convolutional block, wherein the number of channels CA'=512; the convolutional block 254 may be a structure A convolutional block; and the convolutional block 256 may be a structure A block. Accordingly, for the 32×112×112×3 original image frames, the size of the output feature map of the fifth stage 250 may be 2×7×7×2048.

The sixth stage 260 may include two layers. Layer 262 may be a global average pooling layer, and layer 264 may be fully connected layers. Through the sixth stage 260, for the 32×112×112 original image frames, the output feature map of the sixth stage 260 may be 1×1×1×2048.

Although the 3-D separable baseline neural network 200 includes temporal convolution operations in several neural network layers, the 3-D temporal convolution operations only extract limited temporal information from the input sequence of image frames 202. For example, in the embodiments shown in FIG. 2, the temporal convolution operations only operate on 3 frames of a feature map in the neighborhood at a time. The time corresponding to the 3 frames may not be sufficient for understanding, classifying, and analyzing semantic meaning of the content of a video clip with respect to time. It is necessary to modify the 3-D separable baseline neural network 200 to extract temporal information on multiple and larger temporal scales and supplement the temporal information to the extracted feature maps.

Figure 4:
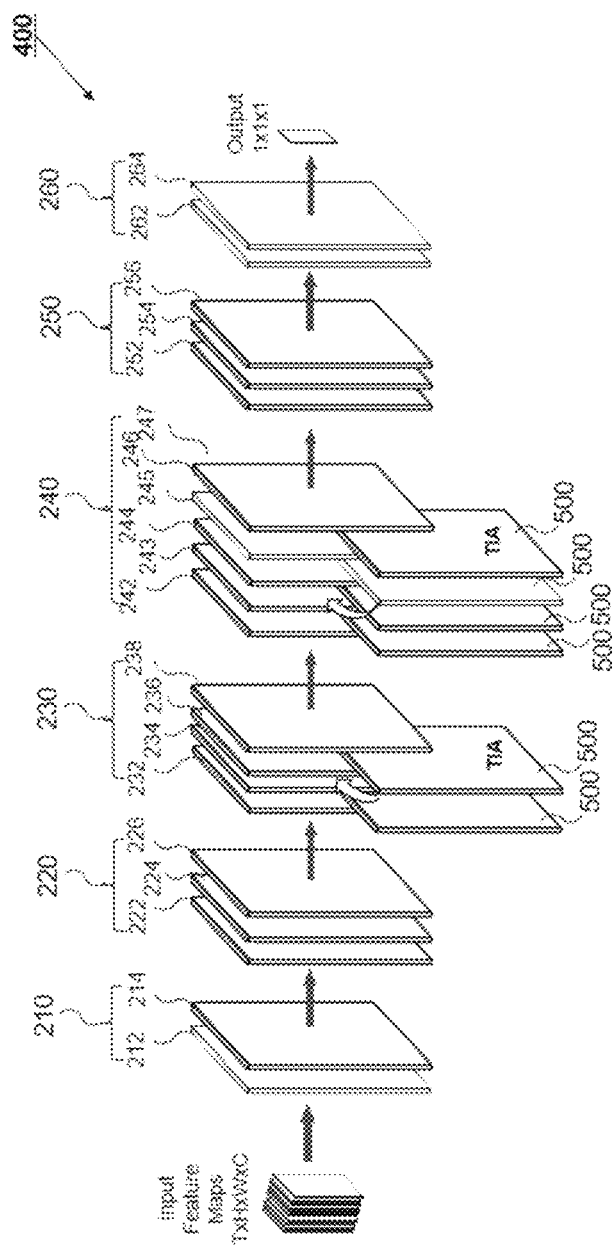
FIG. 4 illustrates a structure of the modified neural network for classifying video clips in accordance with some embodiments.

FIG. 4 illustrates a structure of the modified neural network 400 for classifying video clips in accordance with some embodiments. In addition to the elements of the 3D baseline neural network 200 as shown in FIG. 2, the modified neural network 400 further includes a plurality of Temporal Information Aggregation (TIA) module/blocks 500 to extract the temporal information of the input video clip image frames 202 with different temporal scales. In FIG. 4, the modified neural network 400 may include a TIA block in every other block in the third stage 230 and the fourth stage 240, i.e., the modified neural network 400 may have 2 TIA blocks 500 inserted in the third stage 230 and 3 TIA blocks 500 inserted in the fourth stage. However, the TIA block 500 may be inserted after any convolutional layer and help to extract the temporal information with different time scales.

Figure 5:
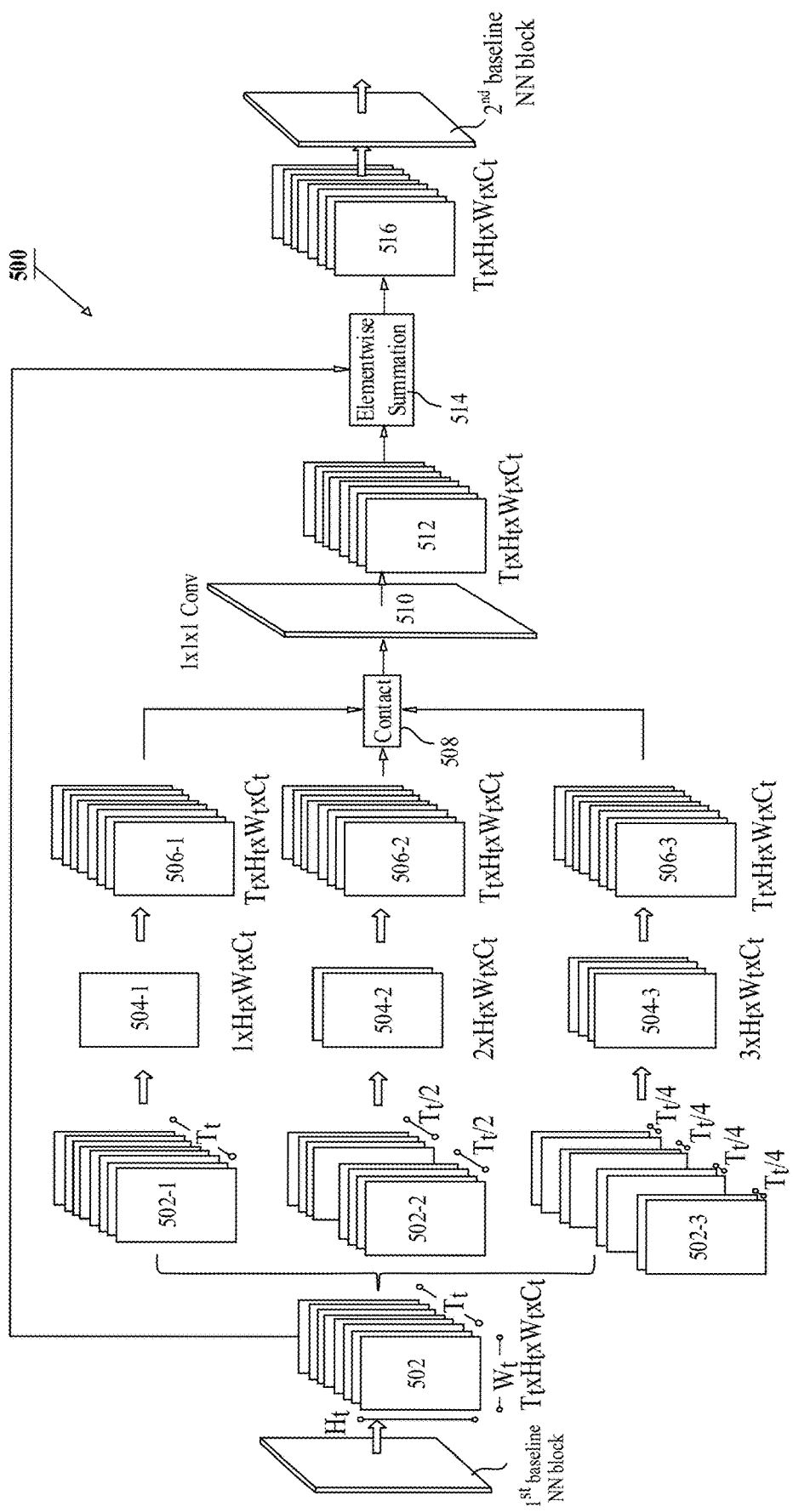
FIG. 5 is an illustration of a Temporal Information Aggregation block in accordance with some embodiments.

FIG. 5 is an illustration of the TIA block 500 in accordance with some embodiments. As state above, the TIA block 500 may be connected in series between 2 baseline neural network blocks.

The baseline neural network block ("first baseline neural network block") before the TIA block may be a 3-D separable neural network block designed and/or constructed to convert a first feature map to a second feature map. The first feature map may be a feature map of the plurality of image frames 202. Further, the baseline neural network block may convert the first feature map to the second feature map through extracting one or more spatial features and one or more temporal features independently through different neural network layers.

The TIA block (a.k.a., the "target neural network block") 500 may be adjacent to, and connected in series with, the first baseline neural network block. Further, the TIA block 500 may be designed and/or constructed to process the second feature map 502 in the temporal domain and generate a third feature map 516.

To this end, the TIA block 500 may include a pooling unit. The pooling unit may include n pooling layers be designed and/or constructed to temporally pooling the second feature map 502 to n first intermediate feature maps {504-$i$}, wherein $i=1, 2, \ldots, n$, using n pooling window of different sizes, respectively. Here, n is a predetermined positive integer. For example, in the embodiment, the second feature map 502 may be of a size of $Tt \times Ht \times Wt \times Ct$, where the subscription t means the target neural network block, i.e., the TIA block. To efficiently combine multiscale temporal information, temporal pooling is employed with various scales to capture temporal information of the second feature map 502 at different resolutions. For example, in FIG. 5, the TIA block 500 may include 3 pooling layers (n=3), each independently adopts a temporal pooling window. To extract different temporal information from the baseline neural network 200, the size of each pooling window may be different from the kernel sizes of the baseline neural network 200 with respect to the temporal domain. Specifically, because the temporal information extracted by the baseline neural network 200 corresponds to short time period, all of the n pooling window sizes may be greater than the kernel sizes of the baseline neural network 200 with respect to temporal domain. Further, the size of the n pooling window may corresponds to the time length, of which the modified neural network 400 may intend and/or be designed to understand the temporal information.

For example, the first pooling window may employ a size of Tt. Accordingly, the first feature map 502-1 may be temporally pooled into the first intermediate feature map 504-1 (size of $1 \times Ht \times Wt \times Ct$). The second pooling window may employ a size of Tt/2. Accordingly, the second feature map 502-2 may be temporally pooled into the first intermediate feature map 504-2 (size of $2 \times Ht \times Wt \times Ct$). The third pooling window size may be Tt/4. Accordingly, the third feature map 502-3 may be temporally pooled into the first intermediate feature map 504-3 (size of $4 \times Ht \times Wt \times Ct$);

The TIA block 500 then may respectively and temporally rescale the temporally subsampled feature maps (e.g., the second intermediate feature map 504-1, 504-2, and 504-3) to a predetermined size, resulting second intermediate feature maps 506. In some embodiments, the predetermined size may be the original size of the second feature map 502, i.e., $Tt \times Ht \times Wt \times Ct$. For example, in FIG. 5, the first intermediate feature map 504-1 may be rescaled back to $Tt \times Ht \times Wt \times Ct$, resulting the second intermediate feature map 506-1; the first intermediate feature map 504-2 may be rescaled back to $Tt \times Ht \times Wt \times Ct$, resulting the second intermediate feature map 506-2; and the first intermediate feature map 504-3 may be rescaled back to $Tt \times Ht \times Wt \times 1$, resulting the second intermediate feature map 506-3.

The TIA block 500 may then concatenate the second intermediate feature maps (e.g., 506-1, 506-2, 506-3) along channel axis of the subsampled feature maps, resulting in a concatenated feature map of size $Tt \times Ht \times Wt \times nCt$ (e.g., Ct=1, n=3). For example, in FIG. 5, the TIA block 500 may include a concatenator 508 to concatenate the second intermediate feature maps 506-1, 506-2, and 506-3 along their channel axis C. Because each of the second intermediate feature map is of a size of $Tt \times Ht \times Wt \times Ct$, the resulted concatenated feature map may be of 3 channels, expressed as $Tt \times Ht \times Wt \times 3Ct$.

Then a $1 \times 1 \times 1$ convolutional layer 510 may be applied to the concatenated feature map to produce a residual feature map of a predetermined size. To this end, the TIA block may include a $1 \times 1 \times 1$ convolutional layer 510 to change the channel size of the concatenated feature map to the same size as the second feature map 502, i.e., the channel size may be shrunk from nCt to Ct. The resulting feature map may be a residual feature map 512 at a size of $Tt \times Ht \times Wt \times Ct$.

Next, the residual feature map 512 may be added to the input feature map (i.e., the second feature map 502) as residual information to generate the output feature map (i.e., a third feature map 516) of the TIA block 500. According to embodiments, the TIA block 500 may further include a summation unit 514 to perform an elementwise summation between the second feature map 502 and the residual feature map 512.

The temporal pooling employed by the TIA block 500 may be any suitable pooling algorithms. For example, the TIA block 500 may employ either average or maximum pooling. According to embodiments, the TIA block 500 may utilize max pooling. Further, the rescaling employed in the TIA block 500 may be any type of suitable rescaling algorithms. For example, the TIA block 500 may employ interpolation or deconvolution for rescaling feature maps. According to embodiments, the TIA block 500 may utilize bilinear interpolation for rescaling feature maps.

The TIA block 500 may output the third feature map 516 to a second baseline neural network block. Before modification, the second baseline neural network block may be a block adjacent to the first baseline neural network block in the baseline neural network 200. For example, the second baseline neural network block may be a 3-D ResNet network block. The second baseline neural network block may receive the third feature map 516 and convert the third feature map 516 to a fourth feature map by process at least one spatial feature of the second feature map.

In a variety of domains, it is often natural and meaningful to represent a data object with a collection of its parts or component features. As can be seen through the above embodiments, the temporal convolution operations in the 3-D separable baseline neural network 200 operates on 3 frames of a feature map in the neighborhood at a time. The time corresponding to the 3 frames may not be sufficient for understanding, classifying, and analyzing semantic meaning of the content of the video clip with respect to time. The TIA block 500, however, provide temporal pooling to various temporal scale. By partitioning the temporal information (a sequence of video frames) into divisions from finer to coarser levels, pools temporal pattern at variable scales, and aggregates local features in them. The pooling operation may ensure extracting temporal information on multiple and larger temporal scales and supplement the temporal information to the extracted feature maps. Accordingly, the modified neural network 400 may have a better capability to classify and analyze a video clip.

Figure 6A:
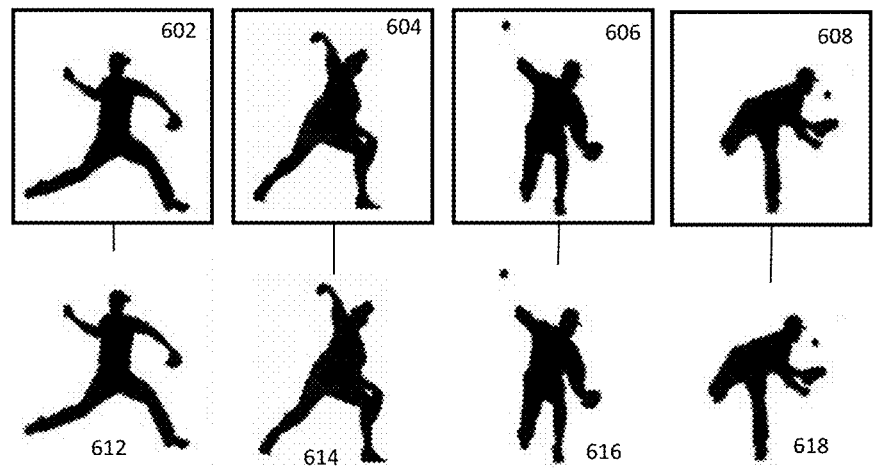
FIG. 6A is a schematic illustration of temporal information that a Temporal Information Aggregation block may extract in accordance with some embodiments.
Figure 6B:
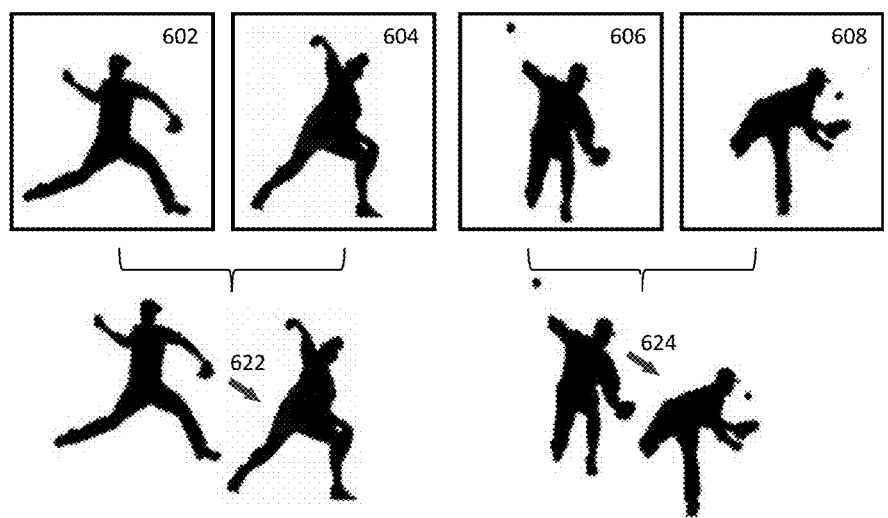
FIG. 6B is another schematic illustration of temporal information that a Temporal Information Aggregation block may extract in accordance with some embodiments.
Figure 6C:
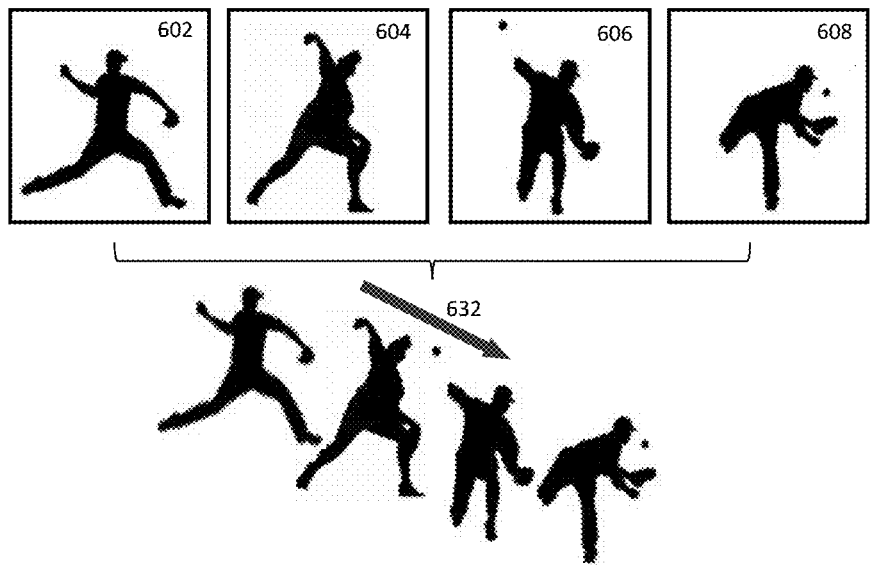
FIG. 6C is further another schematic illustration of temporal information that a Temporal Information Aggregation block may extract in accordance with some embodiments.

FIGS. 6A-6C are schematic illustrations of the temporal information that the TIA block 500 may help to extract. From FIG. 6A to FIG. 6C, the TIA block 500 may partition the temporal information (e.g., a sequence of video frames with size Tt at the temporal axis) into divisions from finer (Tt/4) to coarser levels (Tt), pools temporal pattern at variable scales, and aggregates local features in them.

FIG. 6A is a schematic illustration of temporal information that the TIA block 500 may extract when the pooling window sizes T/4. Because that the pooling window sizes is finer, the TIA block 500 may only extract movement information of a baseball player in relatively shorter time, i.e., 612, 614, 616, and 618.

FIG. 6B is a schematic illustration of temporal information that the TIA block 500 may extract when the pooling window sizes T/2. Accordingly, the TIA block 500 may extract movement information 622, 624 of a baseball player during a longer period of time in comparison with FIG. 6A.

FIG. 6C illustrate a scenario that the TIA block 500 may extract when the pooling window sizes T. Accordingly, the TIA block 500 may extract movement information 632 of a baseball player during the entire sequence of video frames.

Figure 7:
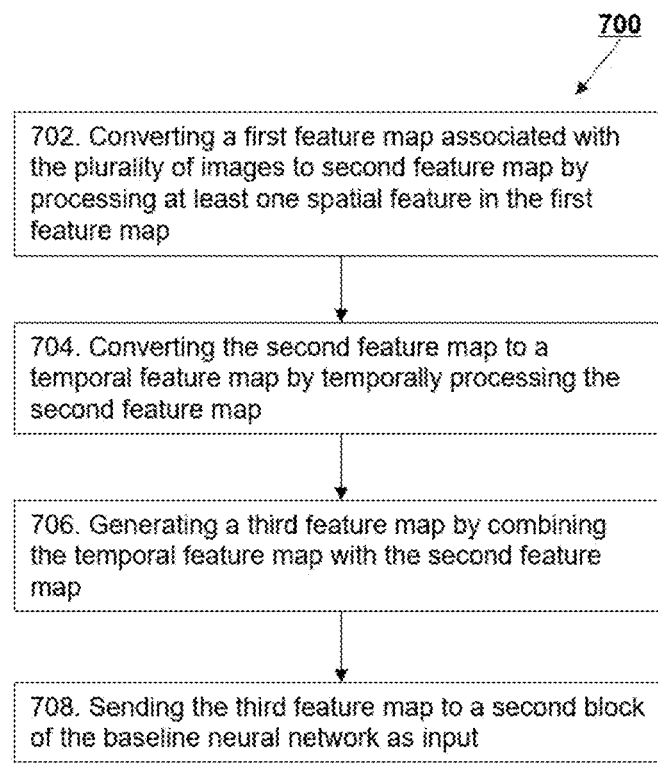
FIG. 7 is a flow chart showing a method for analyzing a plurality of images constructed in a time sequence using at least one neural network, in accordance with embodiments of the present application.

FIG. 7 is a flow chart showing a method for analyzing a plurality of images arranged in a time sequence using at least one neural network. The method and the at least one neural network may be stored in the memory 102 (e.g., non-transitory storage medium, such as CD-ROM, hard disk, etc.) of the electronic device 100, as shown in FIG. 1, as a set of instructions. When executing the methods, the processor(s) 120 of the electronic device 100 may communicate with the memory 102 and then perform the actions and/or method through the modified neural network 400. Therefore, the method below may be described in conjunction with FIG. 4 and FIG. 5, as well as the description thereof.

Step 702, converting, by a first block, a first feature map associated with the plurality of images to second feature map by processing at least one spatial feature in the first feature map.

The converting of the first feature map may be executed by a first block of the baseline neural network, wherein the baseline neural network may be of the same structure as the neural network 200. Further, the converting of the first feature map to the second feature map may include respectively processing the first feature map in temporal domain using a temporal convolutional layer and spatial domain using a spatial convolutional layer. The temporal convolutional layer may include a kernel with a temporal component at temporal axis. For example, the kernel of the temporal convolutional layer may be 3×1×1, in which the temporal component may be the number "3".

Step 704, converting, by a target neural network block, the second feature map to a temporal feature map (e.g., a temporal residual map) by temporally processing the second feature map. For example, the target neural network block may be the TIA block 500.

To this end, the target neural network may first temporally pooling the second feature maps to n intermediate feature maps, using n pooling windows of different temporal scales. Here, n is a predetermined positive integer, such as 3; and the different temporal scales may be Tt, Tt/2, and Tt/4, where Tt is the size of the second feature map along the temporal axis. Further, the temporal scales all of the n pooling window are greater than the temporal component of the kernel. For example, Tt/4 may be greater than the temporal component of the kernel, so that the target neural network may capture additional temporal information in the plurality of video image frames than the temporal convolutional layer of the first block of the baseline neural network.

Next, the target neural network 500 may temporally rescaling each of then intermediate feature maps to a predetermined size. For example, the predetermined size may be a size of the second feature map.

Then, the target neural network 500 may concatenating then rescaled intermediate feature maps to a concatenated feature map. To this end, the target neural network 500 may apply a 1×1×1 convolutional layer to the concatenated feature map to adjust a size of the concatenated feature map to the size of the second feature map, such as shrinking a channel size of the concatenated feature map to a channel size of the second feature map. The adjusted concatenated feature map may be a temporal feature map, e.g., a residual feature map of the target neural network.

Step 706, generating, by the target neural network block 500, a third feature map by combining the temporal feature map with the second feature map. For example, the combination may be elementwise summating of the temporal residual feature map with the second feature map.

Step 708, sending, by the target neural network block 500, the third feature map to a second block of the baseline neural network 200 as input.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. For example, the steps in the methods of the present disclosure may not necessarily be operated altogether under the described order. The steps may also be partially operated, and/or operated under other combinations reasonably expected by one of ordinary skill in the art. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran, Perl, COBOL, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A neural network system implemented by one or more electronic devices, comprising a target neural network block configured to be inserted between a first baseline neural network block and a second baseline neural network block of a baseline neural network, the target neural network block including:
    at least one pooling unit to:
        receive an input feature map outputted by the first baseline neural network block processing an image,
        temporally pooling the input feature map into at least one intermediate feature map;
    at least one other processing unit to:
        temporally process the at least one intermediate feature map to a residual feature map; and
        generate an output feature map configured for inputting into the second baseline neural network block by combining the residual feature map with the input feature map;
    wherein temporal information extracted by the target neural network block is different from temporal information extracted by the baseline neural network.

2. The neural network system of claim 1, wherein the at least one pooling unit is configured to pooling the input feature map to n intermediate feature maps using n pooling windows of different temporal scales, wherein n is a predetermined positive integer greater than 1.

3. The neural network system of claim 2, further comprising:
    the baseline neural network, configured to process a plurality of images constructed in a time sequence, including a first baseline block,
    wherein the first baseline block includes at least one of a temporal convolutional layer to process a first feature map in temporal domain or a spatial convolutional layer to process the first feature map in spatial domain.

4. The neural network system of claim 3, wherein a kernel of the at least one temporal convolutional layer includes a temporal component.

5. The neural network system of claim 2, wherein to generate the residual feature map, the target neural network block is further configured to temporally rescale each of the n intermediate feature maps to a predetermined size.

6. The neural network system of claim 5, wherein to generate the residual feature map, the at least one other processing unit further includes:
    a concatenator to concatenate the n rescaled intermediate feature maps to a concatenated feature map; and
    a layer to generate the residual feature map by temporally rescaling the concatenated feature map to a size of the output feature map.

7. The neural network system of claim 6, wherein to concatenate the n rescaled intermediate feature maps to the concatenated feature map, the target neural network block is configured to concatenate the n rescale intermediate maps along respective channel axis of the n rescale intermediate maps.

8. The neural network system of claim 7, wherein to temporally rescale the concatenated feature map, the layer further includes a convolutional layer to the concatenated feature map to shrink a channel size of the concatenated feature map to a channel size of a second feature map.

9. The neural network system of claim 1, wherein to combine the residual feature map with the input feature map, the at least one other processing unit includes a summation unit to elementwise summate the residual feature map with the input feature map.

10. The neural network system of claim 1, wherein the baseline neural network further includes a second baseline block connected to the target neural network block in series, and the second baseline block is configured to:
receive the output feature map as a third feature map; and
convert the third feature map to a fourth feature map by process at least one of a spatial feature or a temporal feature of the second feature map.

11. The neural network system of claim 1, wherein the baseline neural network employs a 3D ResNet network structure.

12. A method for analyzing a plurality of images constructed in a time sequence using a target neural network block configured to be inserted between a first baseline neural network block and a second baseline neural network block of a baseline neural network, comprising:
receiving an input feature map outputted by the first baseline neural network block processing an image;
temporally pooling the input feature map into at least one intermediate feature map;
temporally process the at least one intermediate feature map to a residual feature map; and
generating an output feature map configured for inputting into the second baseline neural network block by combining the residual feature map with a second feature map;
wherein temporal information extracted by the target neural network block is different from temporal information extracted by the baseline neural network.

13. The method of claim 12, wherein the pooling of the input feature map into at least one intermediate feature map includes temporally pooling the input feature maps to n intermediate feature maps using n pooling windows of different temporal scales, wherein n is a predetermined positive integer greater than 1.

14. The method of claim 13, further comprising:
converting a first feature map to a second feature map as the input feature map by respectively processing the first feature map in at least one of temporal domain using a temporal convolutional layer or spatial domain using a spatial convolutional layer.

15. The method of claim 14, wherein a kernel of the temporal convolutional layer includes a temporal component.

16. The method of claim 14, wherein the combining of the temporal residual feature map with the input feature map includes elementwise summating of the residual feature map with the input feature map.

17. The method of claim 13, wherein the generating of the residual feature map includes temporally rescaling each of the n intermediate feature maps to a predetermined size.

18. The method of claim 17, wherein the generating of the residual feature map further includes:
concatenating the n rescaled intermediate feature maps to a concatenated feature map; and
generating the residual feature map by temporally rescaling the concatenated feature map to a size of the second feature map.

19. The method of claim 18, wherein the temporally rescaling of the concatenated feature map includes applying a convolutional layer to the concatenated feature map to adjust a size of the concatenated feature map to the size of the input feature map.

20. The method of claim 19, wherein the temporally rescaling of the concatenated feature map includes applying a convolutional layer to the concatenated feature map to shrink a channel size of the concatenated feature map to a channel size of the second feature map.

* * * * *